Patented Oct. 23, 1923.

1,471,884

UNITED STATES PATENT OFFICE.

ROBERT R. DEMENT, OF HAMILTON, OHIO.

INK COMPOSITION.

No Drawing. Application filed April 8, 1922. Serial No. 550,867.

*To all whom it may concern:*

Be it known that I, ROBERT R. DEMENT, a citizen of the United States, residing at Hamilton, in the county of Butler and State of Ohio, have invented certain new and useful Improvements in Ink Compositions, of which the following is a specification.

My invention relates in general terms to ink compositions and more particularly it has reference to a printing ink composition and the method of directly transferring designs executed with the ink upon a matrix to a metal cast upon the application of heat.

The method heretofore used for securing special display effects in newspaper and other printing consists of the following major operations. The original sketch or drawing is first created by the artist, an etching or engraving is then prepared from this sketch, a matrix impressed from the etching or engraving and finally a metal cast is moulded from the matrix. I propose to eliminate the separate operations of preparing an etching or engraving and forming a matrix therefrom and to permit of the direct formation of the metal casts from the original drawing. The means, and the method I employ to attain this end lie in the peculiar preparation of the ink, the manner in which it is to be used to create the original drawing, and the method of casting from the drawing.

The principal objects of my invention briefly stated are: 1—to utilize an ink in creating the original drawing which will allow a direct metal casting to be made therefrom; 2—to enable such drawing to be used for making additional metal casts; 3—to provide an ink which is expansible under the influence of heat; 4—to render my ink ineffaceable after it has been thus expanded, thereby preserving the drawing in relief; 5—to compound my ink of but three ingredients and 6—to provide such an ink in powdered from which will be applicable on the addition of water.

For a base I use the salts of the alkalies —sodium, potassium, calcium and ammonium. These salts expressed by their appropriate term as carbonate, etc., will when subjected to heat liberate a gas. The salts of ammonium are preferable for my purpose as the most characteristic property of ammonium is that it combines directly with acids to form salts. Of these I have found that the carbonate liberates the proper amount of gas for my purpose.

As a binder I employ any gum that is soluble in water, gum arabic, dextrin, and mucilage being suitable, although I prefer to use gum-acacia which is gum-arabic in powdered form. The binder serves to hold the various ingredients together, to confine the gas during the chemical action by forming an expansible, container therefor and to maintain the ink in a semi-fixed manner after the chemical action is completed.

The pigment employed may consist of any suitable coloring substance which is soluble in water.

The combination of ingredients which I have found to produce the most satisfactory results consists of the following elements in the proportion named:

1 part pigment, 3 parts carbonate of ammonium, 9 parts gum-acacia.

The ink composition is prepared for use in a powdered form and when used sufficient water is added to convert the mass into a medium consistency. The design is executed by means of a brush or a pen on ordinary cardboard or matrix paper.

The method found most expedient in making castings from a matrix having a design executed thereon with my ink, contemplates filling in those portions of the surface of the matrix with my ink which will be translated into indented portions of the surface of the casting. Consequently, if a certain drawing or design upon the matrix is to be printed by the casting; that portion of the drawing or design will not be treated with the ink; but if the design or drawing is to be outlined by the casting (the figure being shown in white or the like upon the printed stock and the back-ground black or half-tone) the actual drawing or design is filled in with the ink upon the matrix. From the foregoing it will be seen that the ink forms the relief portions upon the matrix, and the indented portions in the surface of the casting made therefrom.

In applying my method of casting directly from a matrix, the ink defining the drawing or design is first allowed to dry, and is then placed in the mold and the molten metal of the casting poured thereon. When the molten metal of the casting reaches the inked portions of the matrix, the heat causes the carbonate of ammonium in the ink to liberate carbon dioxide which causes the ink to expand. The binder in the ink serving to confine the gas, causes the design defined thereby to be brought out in relief, and a consequent indenture, properly defining the figure will be formed in the metal cast. The casting thus made is used in printing the stock, and by using a stippled matrix the raised portions of the casting will print a gray or half-tone figure.

After being expanded by the heat of the molten metal the ink hardens in its raised position, thus permitting the original drawing to be used for making additional metal casts.

The relief figure will be ineffaceable as the relatively large proportion of binder used in my ink composition will hold the particles in a semi-fixed manner.

I claim:

1. An ink composition comprising a gas forming ingredient adapted to be decomposed under the influence of heat, and a soluble elastic binder for confining the gas and adapted to harden into a perceptibly raised container for the gas whereby to provide a fixed design of the ink in relief.

2. An ink for drawing designs comprising carbonate of ammonium for liberating gas upon application of heat, a pigment, and gum acacia forming a binder for confining the gas liberated by the carbonate of ammonium to form a fixed design of the ink in relief.

3. An ink for drawing designs comprising three parts carbonate of ammonium for liberating gas upon the application of heat, one part pigment, and nine parts gum acacia forming a binder for confining the gas liberated by the carbonate of ammonium to form a fixed resign of the ink in relief.

In testimony whereof, I affix my signature hereto.

ROBERT R. DEMENT.